United States Patent
Kobayashi et al.

(10) Patent No.: US 9,659,547 B2
(45) Date of Patent: *May 23, 2017

(54) METHOD AND DEVICE FOR DISPLAYING IMAGES AND TEXT IN ACCORDANCE WITH A SELECTED PATTERN

(71) Applicant: KYOCERA CORPORATION, Kyoto (JP)

(72) Inventors: Hiroki Kobayashi, Daito (JP); Hitoshi Imamura, Daito (JP); Toshinobu Takiguchi, Osaka (JP); Takashi Osanai, Daito (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,069

(22) Filed: Apr. 26, 2016

(65) Prior Publication Data
US 2016/0240171 A1    Aug. 18, 2016

Related U.S. Application Data

(63) Continuation of application No. 14/578,177, filed on Dec. 19, 2014, now Pat. No. 9,396,704, which is a (Continued)

(30) Foreign Application Priority Data

Sep. 4, 2009    (JP) ................. 2009-204702

(51) Int. Cl.
*G06F 3/0482*    (2013.01)
*G09G 5/26*    (2006.01)
(Continued)

(52) U.S. Cl.
CPC ............. *G09G 5/26* (2013.01); *G06F 3/0482* (2013.01); *G06F 3/04817* (2013.01); *G09G 5/37* (2013.01);
(Continued)

(58) Field of Classification Search
None
See application file for complete search history.

(56) References Cited

U.S. PATENT DOCUMENTS

2005/0257170 A1    11/2005  Kim et al.
2006/0020899 A1    1/2006   Gusmorino et al.
(Continued)

OTHER PUBLICATIONS

Vodafone V501SH Online Manual (2005), accessed online at http://broadband.mb.softbank.jp/mb/japanese/mysoftbank/crm/online_manual/pdf/v501sh/v501sh_bas.pdf, 427 pages.

*Primary Examiner* — Ryan D McCulley
(74) *Attorney, Agent, or Firm* — Duane Morris LLP

(57) ABSTRACT

An electronic device and method for displaying a display item is disclosed. A first pattern comprises an image at a first image size and a character string at a first character string size. A second pattern comprises the image at a second image size and the character string at a second character string size, the character string not overlapping the image at the second image size. The second image size is larger than the first image size, and the second character string size is larger than the first character string size. A selected size comprises at least a first size and a second size. The first pattern is displayed for the display item if the selected size is the first size, and the second pattern is displayed for the display item if the selected size is the second size.

3 Claims, 26 Drawing Sheets

Related U.S. Application Data continuation of application No. 12/875,040, filed on Sep. 2, 2010, now abandoned.

(51) Int. Cl.
  *G06F 3/0481* (2013.01)
  *G09G 5/37* (2006.01)
  *G09G 5/373* (2006.01)

(52) U.S. Cl.
  CPC ........... *G09G 5/373* (2013.01); *G06F 3/0481* (2013.01); *G09G 2340/04* (2013.01); *G09G 2340/12* (2013.01); *G09G 2340/145* (2013.01)

(56) References Cited

U.S. PATENT DOCUMENTS

| | | |
|---|---|---|
| 2007/0213099 A1 | 9/2007 | Bast |
| 2008/0074384 A1 | 3/2008 | Orr et al. |
| 2008/0320403 A1 | 12/2008 | Glaberson |
| 2009/0089718 A1 | 4/2009 | Pompilio et al. |

Focus management table  60

| Current normal icon | Downward instruction | Upward instruction | Leftward instruction | Rightward instruction |
|---|---|---|---|---|
| 0 | 3 | 11 | 11 | 1 |
| 1 | 4 | 9 | 0 | 2 |
| 2 | 5 | 10 | 1 | 3 |
| 3 | 6 | 0 | 2 | 4 |
| 4 | 7 | 1 | 3 | 5 |
| 5 | 8 | 2 | 4 | 6 |
| 6 | 9 | 3 | 5 | 7 |
| 7 | 10 | 4 | 6 | 8 |
| 8 | 11 | 5 | 7 | 9 |
| 9 | 1 | 6 | 8 | 10 |
| 10 | 2 | 7 | 9 | 11 |
| 11 | 0 | 8 | 10 | 0 |

Figure 8

Normal-focus icon-drawing table 70

| Current normal icon | Drawing position | Normal focus icon information |
|---|---|---|
| 0 | (X0, Y0) | Adr0, W0, H0 |
| 1 | (X1, Y1) | Adr1, W1, H1 |
| 2 | (X2, Y2) | Adr2, W2, H2 |
| 3 | (X3, Y3) | Adr3, W3, H3 |
| 4 | (X4, Y4) | Adr4, W4, H4 |
| 5 | (X5, Y5) | Adr5, W5, H5 |
| 6 | (X6, Y6) | Adr6, W6, H6 |
| 7 | (X7, Y7) | Adr7, W7, H7 |
| 8 | (X8, Y8) | Adr8, W8, H8 |
| 9 | (X9, Y9) | Adr9, W9, H9 |
| 10 | (X10, Y10) | Adr10, W10, H10 |
| 11 | (X11, Y11) | Adr11, W11, H11 |

830
→ AABBCC I I JJKKMMN

Figure 12B

830
→ AABBCCIIJJKKMMN

Figure 13

Enlarged-focus icon-drawing table 90

| Current enlarged icon | Drawing position | Enlarged focus icon information | Character string information |
|---|---|---|---|
| 0 | (X20, Y20) | Adr20, W20, H20 | Adr50 |
| 1 | (X21, Y21) | Adr21, W21, H21 | Adr51 |
| 2 | (X22, Y22) | Adr22, W22, H22 | Adr52 |
| 3 | (X23, Y23) | Adr23, W23, H23 | Adr53 |
| 4 | (X24, Y24) | Adr24, W24, H24 | Adr54 |
| 5 | (X25, Y25) | Adr25, W25, H25 | Adr55 |
| 6 | (X26, Y26) | Adr26, W26, H26 | Adr56 |
| 7 | (X27, Y27) | Adr27, W27, H27 | Adr57 |
| 8 | (X28, Y28) | Adr28, W28, H28 | Adr58 |
| 9 | (X29, Y29) | Adr29, W29, H29 | Adr59 |
| 10 | (X30, Y30) | Adr30, W30, H30 | Adr60 |
| 11 | (X31, Y31) | Adr31, W31, H31 | Adr61 |

METHOD AND DEVICE FOR DISPLAYING IMAGES AND TEXT IN ACCORDANCE WITH A SELECTED PATTERN

CROSS-REFERENCE TO RELATED APPLICATION

This application is a continuation of U.S. application Ser. No. 14/578,177, filed Dec. 19, 2014, which is a continuation of U.S. application Ser. No. 12/875,040, which was filed on Sep. 2, 2010, which claims priority under 35 U.S.C. §119 to Japanese Patent Application No. 2009-204702, filed on Sep. 4, 2009, entitled "ELECTRONIC DEVICE AND INFORMATION PROCESSING PROGRAM." The contents of each are incorporated by reference herein in their entirety.

FIELD

Embodiments of the present disclosure relate generally to electronic devices, and more particularly relate to an electronic device comprising a display operable to display a menu screen.

BACKGROUND

In current mobile electronic devices, a menu screen with a normal size is displayed on a display when a normal character size, boldness or font style is selected. In the menu screen, icons are displayed in a grid alignment comprising an image and a character string that represent the content of each item represented by the icon. When a larger font size is selected or set, a menu screen with an enlarged size is displayed. In the enlarged menu screen, the character strings may be presented in a list with only the character strings displayed, and the normal size icon images may not be displayed.

In a multifunctional electronic device such as a mobile phone, a relatively large number of icons are displayed, and the size of each icon is relatively small. For this reason, a number of characters in a character string drawn in an icon is limited. Therefore, adjustments are generally made to the character string to allow a user to understand the content of each item based on both an image and a character string. In addition, when the font is set to a large size, the character string that is used when the small size font is set is simply enlarged; therefore, if the corresponding image is not displayed, it may be difficult to understand the content of each item in one glance.

SUMMARY

An apparatus and method for displaying a display item is disclosed. A first pattern comprises an image at a first image size and a character string at a first character string size. A second pattern comprises the image at a second image size and the character string at a second character string size, the second character string does not overlap the image at the second image size. The second image size is larger than the first image size, and the second character string size is larger than the first character string size. A selected size comprises at least a first size and a second size. The first pattern is displayed to present the display item if the first size is selected, and the second pattern is displayed to present the display item if the second size is selected.

In a first embodiment, an electronic device comprises a storage module operable to store an image and a character string representing content of a predetermined item. The electronic device further comprises a size selection module operable to select a selected size from at least a first size and a second size. The electronic device also comprises a display control module operable to set a display pattern to a first pattern comprising the image at a first image size and the character string at a first character string size if the selected size is the first size. The display control module is further operable to set the display pattern to a second pattern comprising the image at a second image size and the character string at a second character string size if the selected size is the second size. The second image size is larger than the first image size and the second character string size is larger than the first character string size. The electronic device also comprises a display operable to display the display pattern, the second pattern is displayed with the image on a first display area of the display and the character string on a second display area of the display different from the first display area if the selected size is the second size.

In a second embodiment, a method for operating an electronic device comprises providing a first pattern comprising an image at a first image size and a character string at a first character string size. The method further comprises providing a second pattern comprising the image at a second image size and the character string at a second character string size. The character string not overlapping the image at the second image size. The method also comprises receiving a size selection for a display item. The second image size is larger than the first image size, and the second character string size is larger than the first character string size. The method also comprises displaying the first pattern if the size selection is a first size, and displaying the second pattern if the size selection is a second size.

In a third embodiment, a computer readable medium comprising program code for operating an electronic device. The program code comprises providing a first pattern comprising an image at a first image size and a character string at a first character string size. The program code further comprises providing a second pattern comprising the image at a second image size and the character string at a second character string size, the character string not overlapping the image at the second image size. The program code also comprises receiving a size selection for a display item. The second image size is larger than the first image size and the second character string size is larger than the first character string size. The program code also comprises displaying the first pattern if the size selection is a first size, and displaying the second pattern if the size selection is a second size.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 6 is an illustration of an exemplary focus management table according to an embodiment of the present disclosure.

FIG. 8 is an illustration of an exemplary drawing table of the normal focus icons according to an embodiment of the present disclosure.

FIGS. 12A and 12B are illustrations of exemplary schematic diagrams showing a case in which a certain character string displayed in a display area of the enlarged menu screen shown in FIG. 9 is drawn with text, and a case in which the character string is drawn with an image.

FIG. 13 is an illustration of an exemplary drawing table of the enlarged focus icons according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, an information processing device such as a mobile phone. Embodiments of the disclosure, however, are not limited to such mobile phone, and the techniques described herein may also be utilized in other applications. For example, embodiments may be applicable to digital books, digital cameras, electronic game machines, digital music players, personal digital assistance (PDA), ATM, personal handy phone system (PHS), lap top computers, TV's, GPS's or navigation systems, machining tools, pedometers, health equipment such as weight scales, display monitors, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
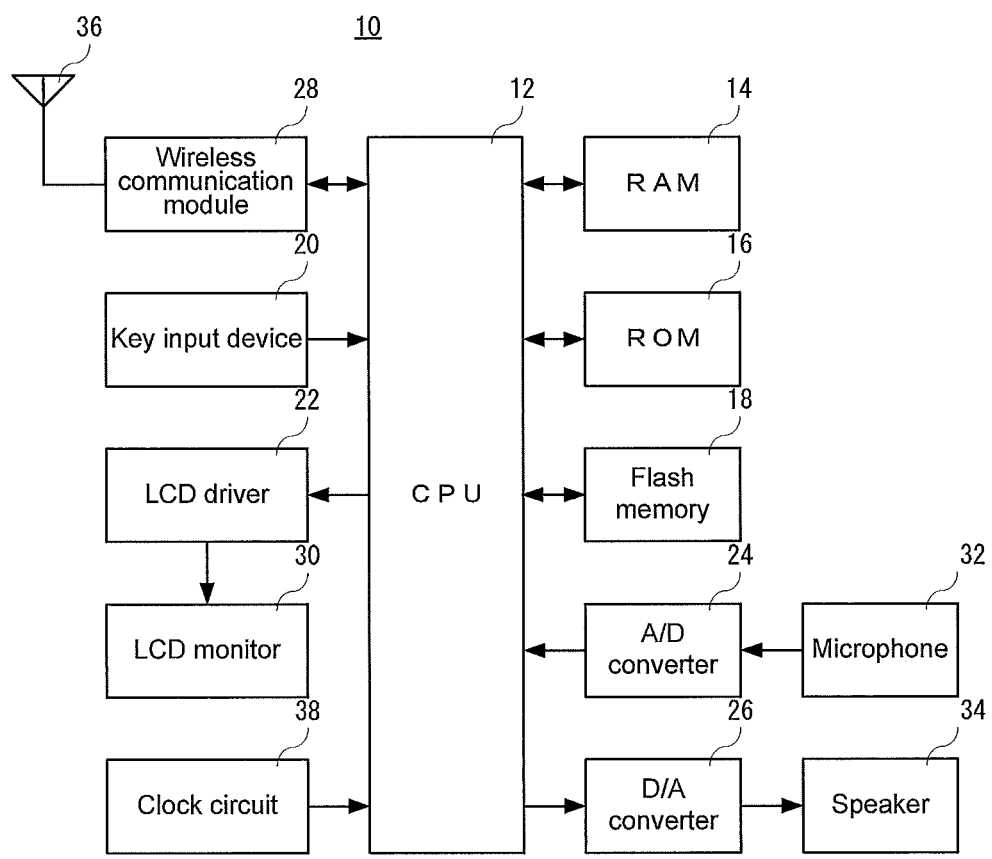
FIG. 1 is an illustration of a schematic functional block diagram of a mobile phone according to an embodiment of the present disclosure.

FIG. 1 is an illustration of a schematic functional block diagram of a mobile phone 10 according to an embodiment of the disclosure. The mobile phone 10 comprises a control processing unit (CPU) 12, a random access memory (RAM) 14, a read only memory (ROM) 16, a flash memory 18, a key input device 20, an LCD driver 22, an A/D converter 24, a D/A converter 26, a wireless communication module 28, and a clock circuit 38 connected via a bus (not shown). In addition, an LCD monitor 30 is coupled to the LCD driver 22, a microphone 32 is coupled to the A/D converter 24, and a speaker 34 is coupled to the D/A converter 26 via an amplifier (not shown). An antenna 36 is coupled to the wireless communication module 28.

The CPU 12 manages the overall control of the mobile phone 10. The RAM 14 is utilized as a working area (including a drawing area) or a buffer area of the CPU 12. The ROM 16 is, for example but without limitation, an electrically rewritable memory such as an EEPROM and stores various programs that are executed by the CPU 12 as well as various data that are utilized by these programs. The flash memory 18 records data of the user of the mobile phone 10, such as but without limitation, a profile, an address book, and a schedule book, and the like. The flash memory 18 also records content data, such as but without limitation, characters, images, voices, sounds, and videos, and the like.

The key input device 20 comprises a plurality of keys such as dialing keys 20a (FIG. 2), which comprises the keys "0" to "9", a "*" key, and a "#" key, and information regarding keys operated by the user (key data) is input to the CPU 12. The LCD driver 22 controls the display of the LCD monitor 30, which is coupled to the LCD driver 22, based on instructions from the CPU 12.

The A/D converter 24 converts an analog voice signal of a voice or a sound input through the microphone 32 coupled to the A/D converter 24 into a digital signal. The D/A converter 26 converts (decodes) the digital voice signal into an analog voice signal and provides the signal to the speaker 34 via an amplifier. Therefore, the voice or the sound corresponding to the analog voice signal is output from the speaker 34.

The wireless communication module 28 performs radio communication using, for example but without limitation, a Code Division Multiple Access (CDMA) protocol. For example, when the user issues an instruction for a call request using the key input device 20, the wireless communication module 28 performs a call request operation based on instructions from the CPU 12 and outputs a call request signal via the antenna 36. The call request signal is transmitted to another party's phone via a base station and a communication network (not shown). Then, when a call reception operation is performed, a connected state (communicable state) is established, and the CPU 12 executes a call process (hereinafter referred to as "normal call process").

Specifically, in the normal call process, a modulated voice signal (high-frequency signal) that is transmitted by the other party's phone is received by the antenna 36. The received modulated voice signal is demodulated and decoded by the wireless communication module 28. The received voice signal that is acquired by these processes is converted into an analog voice signal by the D/A converter 26 and then output from the speaker 34. On the other hand, the transmitted voice signal captured through the microphone 32 is converted into a digital voice signal by the A/D converter 24 and then sent to the CPU 12. The transmitted voice signal that is converted into a digital voice signal is coded and modulated by the wireless communication module 28 based on instructions from the CPU 12 and output via the antenna 36. Therefore, the modulated voice signal is transmitted to the other party's phone via the base station and the communications network.

When a call request signal from the other party's phone is received by the antenna 36, the wireless communication module 28 notifies the CPU 12 of an incoming call (call reception). In response to this incoming notification, the CPU 12 controls the LCD driver 22 to display information on the source of the call (phone number, name of caller, or both), which is described in the incoming notification, on the LCD monitor 30. In addition, the CPU 12 outputs an incoming call tone (or an incoming melody or incoming call voice) from a speaker (not shown) for the incoming notification at substantially a same time. When the user issues an instruction for call reception using the key input device 20, the wireless communication module 28 executes the call reception operation based on instructions from the CPU 12, a connected state (communicable state) is established, and the CPU 12 executes the normal call process.

The CPU 12 acquires at least a current time from the clock circuit 38, which is a real time clock (RTC), or the like. For example, the CPU 12 controls the LCD driver 22 as described above to display the current time on the LCD monitor 30 (clock display).

Figure 2:
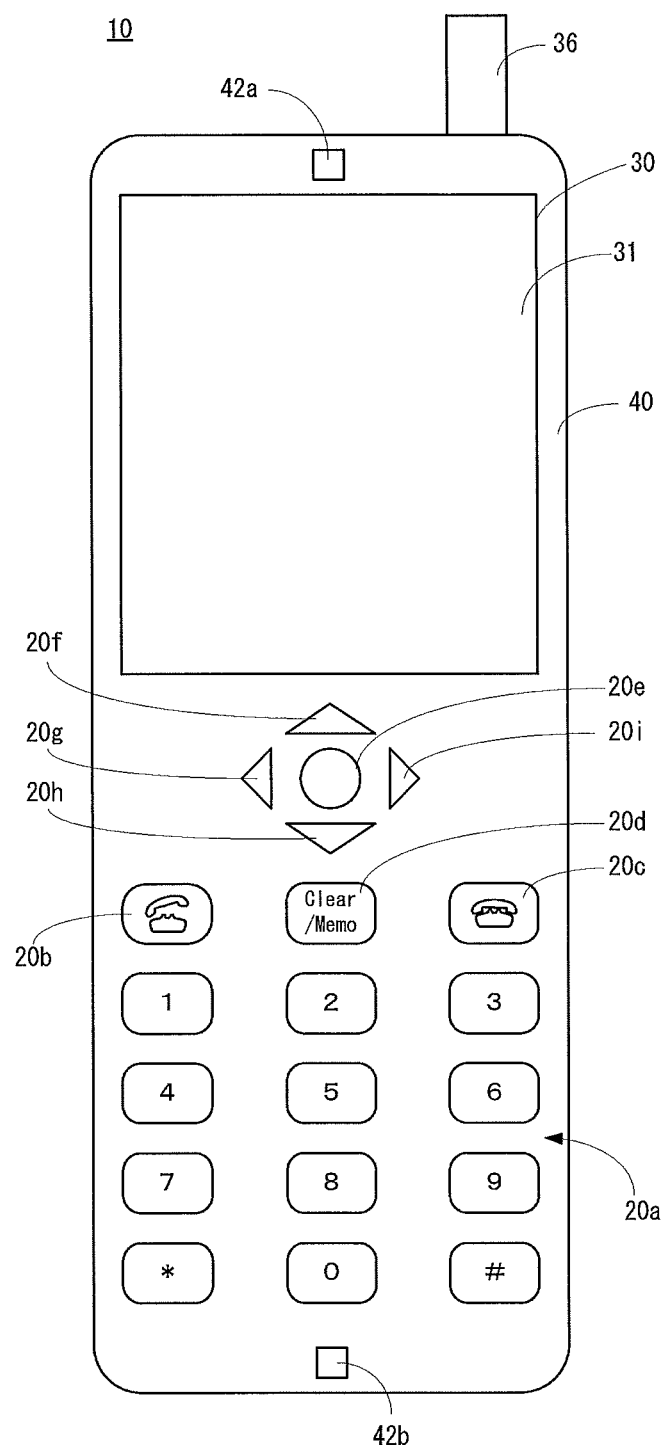
FIG. 2 is an illustration of an external view of a mobile phone according to an embodiment of the present disclosure.

FIG. 2 is an external view of the mobile phone 10 shown in FIG. 1. The mobile phone 10 comprises a case (housing) 40 formed into a plate. The LCD monitor 30 (FIG. 1) is installed in the case 40 with its display surface 31 exposed. The display surface 31 of the LCD monitor 30 has a size that substantially occupies an upper half of the case 40. In addition, the key input device 20 is arranged in a lower side of the LCD monitor 30 so that the pressing parts (operating parts) of each key are exposed from the case 40. In the embodiment shown in FIG. 2, the key input device 20 comprises dialing keys 20a, a call request key 20b, a call termination key 20c, a clear/memo key 20d, a center key 20e, an upward key 20f, a leftward key 20g, a downward key 20h, and a rightward key 20i.

The arrangement and design of each of the keys 20a through 20i need not be limited to the content shown in FIG. 2 and may be configured in an arbitrary manner. In addition, the number of keys may be appropriately increased or decreased depending on the functions of the mobile phone 20.

The antenna 36 is provided to the case 40 so that part of the antenna protrudes from the upper end part of the case. Furthermore, as shown in FIG. 2, a hole 42a and a hole 42b are provided on the case 40 at the upper and lower parts and on the surface on the side where the display surface of the LCD monitor 30 and the pressing parts of the key input device 20 are provided. The speaker 34 (not shown in FIG. 2) is provided inside the case 40 at a position corresponding to the position where the hole 42a is provided. The microphone 32 (not shown in FIG. 2) is also provided inside the case 40 at a position corresponding to the position where the hole 42b is provided. Therefore, the user can hear a voice (sound) output from the speaker 34 and can input user's speech (call origination) into the microphone 32.

In this manner, predetermined functions of the mobile phone 10 can be set or edited (changed, modified, deleted, etc.). For example, in FIG. 3A, a normal menu screen 50 for selecting an execution of settings as well as editing of various functions is displayed on the LCD monitor 30. In the normal menu screen 50, the size of an image and a character string is small compared to that of an enlarged menu screen 80 as described below in the context of discussion of FIGS. 9A and 9B. In an embodiment, two kinds of display sizes are selected; a smaller display size referred to as the "normal size", and a larger size display referred to as the "enlarged size".

Figure 3A:
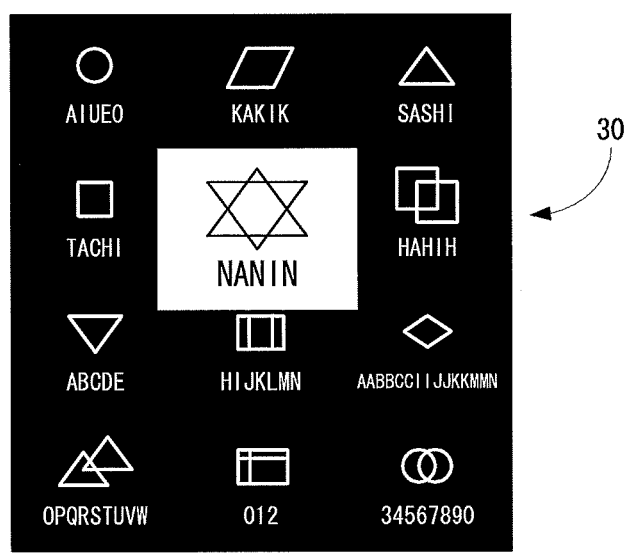
FIGS. 3A to 3C are illustrations of exemplary normal menu screens, each displaying on a display monitor of the mobile phone shown in FIG. 1 according to an embodiment of the present disclosure.
Figure 3B:
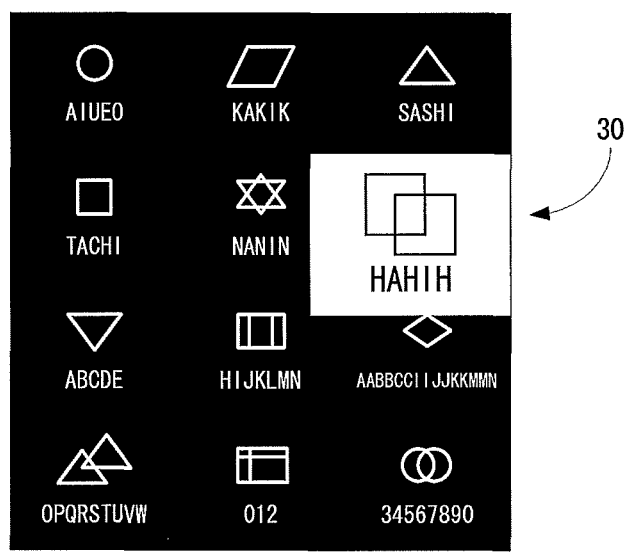
Figure 3C:
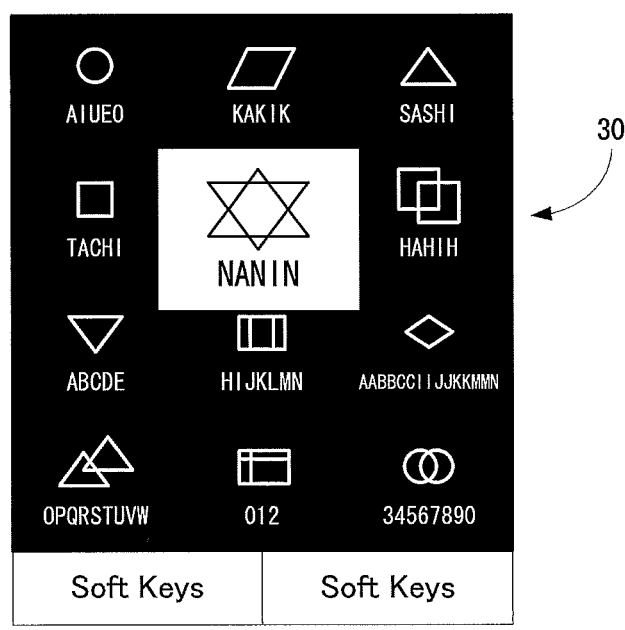

FIGS. 3A to 3C are illustrations of exemplary normal menu screens, each displayed on the display monitor 30 of the mobile phone 10. In FIGS. 3A and 3B, although images representing a content of each of the icons (items) are shown with simple graphics and patterns, in practice, images (graphics symbols, illustrations, etc.) representing some functions (contents) are drawn (displayed). Similarly, although character strings representing the content of each of the icons are shown using appropriate hiragana and alphabetic characters and numbers, in practice, character strings representing the contents are drawn (displayed). The embodiment shown in FIG. 3C, comprises soft keys that can be used for input.

Figure 4A:
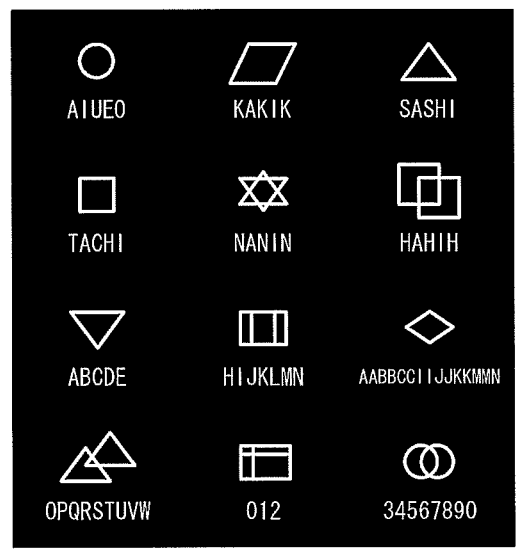
FIGS. 4A and 4B are illustrations of schematic diagrams showing an exemplary normal background image comprising a normal menu screen shown in FIG. 3A to 3C as well as normal icons in a normal background image according to an embodiment of the present disclosure.
Figure 4B:
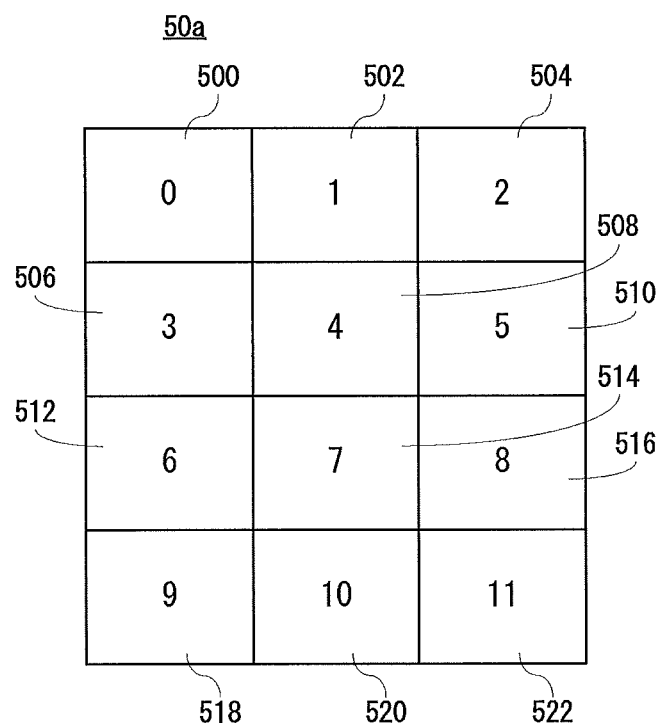

FIGS. 4A and 4B are illustrations of schematic diagrams showing an exemplary normal background image composing the normal menu screen shown in FIG. 3 as well as normal icons comprised in the normal background image. The normal menu screen 50 comprises a background image (normal background image) 50a drawn with a normal size comprising a plurality of icons 500, 502, 504, 506, 508, 510, 512, 514, 516, 518, 520 and 522 as shown in FIG. 4B. However, the normal background image 50a is a single image. A "normal icons" 500 through 522 are displayed in a reticular pattern (grid display). In addition, each of the normal icons 500 through 522 is managed identifiably. For example, numbers from "0" to "11" are assigned sequentially from the upper left normal icon 500 as identification information (ID number). In FIG. 4B, for ease of explanation, the patterns (images and character strings) and the background (background color) of the normal icons 500 through 522 are not shown.

In addition, as shown in FIGS. 3A and 3B, in the normal menu screen 50, a selected (instructed) normal icon (any one of 500 through 522 icons) is highlighted and displayed (focused and displayed). Hereinafter, in this document when the reference numbers of the normal icons 500 through 522, normal focus icons 550 through 572, enlarged icons 800 through 822, and enlarged focus icons 850 through 872 are shown in brackets, it means that it is one of the icons.

Figure 5:
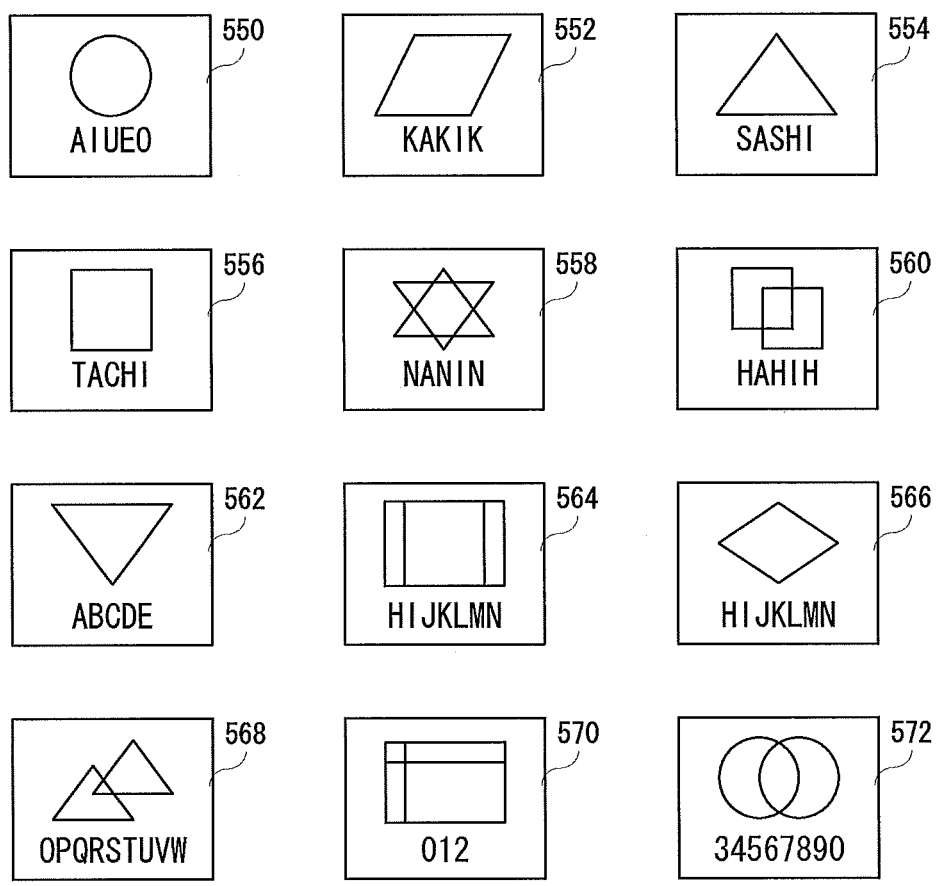
FIG. 5 is an illustration of an exemplary normal focus images (normal focus icons) comprising the normal menu screen shown in FIGS. 3A to 3C.

FIG. 5 is an illustration of an exemplary normal focus images (normal focus icons) comprising the normal menu screen 50 shown in FIG. 3. In the embodiment shown in FIG. 5, in response to selecting each of the normal icons 500 through 522, the normal focus icons 550, 552, 554, 556, 558, 560, 562, 564, 566, 568, 570 and 572 for focusing and displaying them are provided in advance. However, the normal focus icons 550 through 572 may be collectively referred to as a "normal focus image 50b". The normal focus icons 550 through 572 are icons in which the display form of the corresponding normal icons 500 through 522 is changed. Specifically, the size of the normal focus icons 550 through 572 is enlarged compared to the size of the normal icons 500 through 522 and the size of a pattern (an image and a character string) drawn on an icon is also enlarged. In addition, white and black are reversed between the normal focus icons 550 through 572 and the normal icons 500 through 522.

The normal icons 500 through 522 and the normal focus icons 550 through 572 may be any color, such as but without limitation, monochrome, gray scale, multiple colors, and the like. When multiple colors are used, the color between the enlarged focus icons 550 through 572 and the normal icons 500 through 522 may be reversed. In addition, brightness and/or actual color of the enlarged focus icons 550 through 572 may be changed. Because the normal focus icons 550 through 572 are required to be more highlighted than the normal icons 500 through 522, the normal focus icons 550 through 572 are not limited to the form shown in the embodiment shown in FIG. 5, and other forms may be used.

Therefore, in the normal menu screen 50 shown in FIG. 3A, the normal icon 508 identified by "4" is selected, and the normal focus icon 558 corresponding to the normal icon 508 is being displayed on the normal background image 50a at a predetermined position. In addition, in the normal menu screen 50 shown in FIG. 3B, the normal icon 510 identified with "5" is selected, and the normal focus icon 560 corresponding to the normal icon 510 is being displayed on the normal background image 50a at a predetermined position.

FIG. 6 is an illustration of an exemplary focus management table 60 according to an embodiment of the disclosure. In the embodiment shown in FIG. 6, the normal icon 500 through 522 selected (instructed) by the user can be changed by pressing/activating the upward direction key 20f, the leftward key 20g, the downward key 20h or the rightward key 20i. However, this change is performed in accordance with predetermined rules shown in the focus management table 60. As shown in the focus management table 60, four identification numbers are described in accordance with the identification number of the currently selected normal icon 500 through 522. The leftmost identification number of the four identification numbers is the identification number of the normal icon 500 through 522 selected by changing from the currently selected normal icon 500 through 522 when the downward key 20h is operated. In addition, the second identification number from the left of the four identification numbers is the identification number of the normal icon 500 through 522 selected by changing from the currently selected normal icon 500 through 522 when the upward key 20f is operated. Furthermore, the third identification number from the left of the four identification numbers is the identification number of the normal icon 500 through 522 selected by changing from the currently selected normal icon 500 through 522 when the upward key 20g is operated. Then, the rightmost identification number of the four identification numbers is the identification number of the normal icon 500 through 522 selected by changing from the currently selected normal icon 500 through 522 when the rightward key 20i is operated.

Therefore, for example, when the normal icon 510 is currently selected, its identification number is "5", and when the leftward key 20g is operated in this case, the normal icon 508 with the identification number "4" is selected. In addition, when the normal icon 522 is currently selected, its identification number is "11", and when the downward key 20h is operated in this case, the normal icon 500 with the identification number "0" is selected. In an embodiment, the normal icon 500 through 522 to be selected is similarly changed in accordance with the focus management table 60.

In this manner, when the normal icon 500 through 522 to be selected is changed and the icon 500 through 522 to be selected is focused and displayed, a corresponding normal focus icon 550 through 572 is drawn (attached) on the normal background image 50a at a predetermined position as described above. In this manner, the normal focus icon 550 through 572 is drawn on a front (upper layer) of a corresponding normal icon 500 through 522. However, as described above, because the normal focus icons 550 through 572 are set to a larger size compared to the size of the normal icons 500 through 522, the position for drawing (drawing position) is set in advance so as not to protrude from the normal background image 50a (i.e., the display surface of the LCD monitor 30). In an embodiment, when the upper left corner of the normal background image 50a is a reference point (origin O), a rightward distance (X) and a downward distance (Y) from the origin O to the upper left corner of each of the focus icons 550 through 572 is set in advance as a drawing position (drawing coordinates).

Figure 7A:
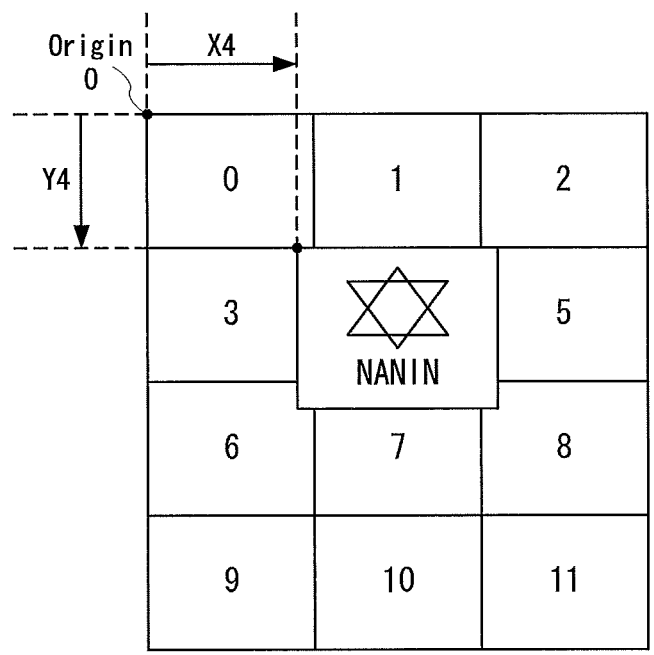
FIGS. 7A and 7B are illustrations of schematic diagrams showing drawing positions of normal focus icons according to an embodiment of the present disclosure.
Figure 7B:
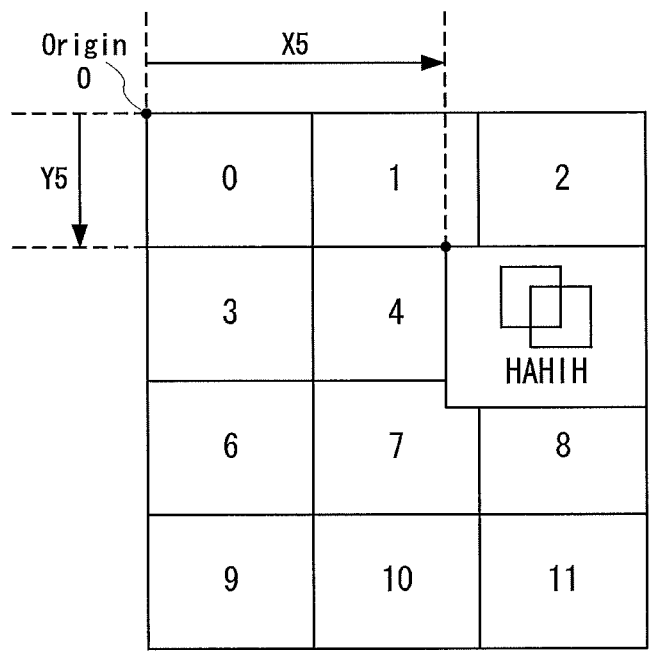

FIGS. 7A and 7B are illustrations of schematic diagrams showing drawing positions of normal-focus icons according to an embodiment of the disclosure. For example, as shown in FIG. 3A, the drawing position of the normal focus icon 558 of the normal icon 508 with the identification number "4" is, as shown in FIG. 7A, aligned with the corresponding normal icon 508 at the center position in the horizontal direction and its upper side is set to a position overlapping with the upper side of the normal icon 508. In this manner, the drawing position (X4, Y4) of the normal focus icon 558 corresponding to the normal icon 508 with the identification number "4" is set.

Similarly, as shown in FIG. 3B, the drawing position of the normal focus icon 560 of the normal icon 510 with the identification number "5" is, as shown in FIG. 7B, aligned with the corresponding normal icon 510 at the left side and its upper side is set to a position overlapping with the upper side of the normal icon 510. In this manner, the drawing position (X5, Y5) of the normal focus icon 560 corresponding to the normal icon 510 with the identification number "5" is set.

However, although it is not shown in the drawings, the same also applies for the drawing position of the other normal focus icon (550 through 556, 562 through 527). The drawing positions (Xn, Yn) (n=0, 1, . . . , 11) of the normal icons 550 through 572 are on the corresponding normal icons 500 through 522 and, as described above, are set to the positions at which the icons are displayed without protruding from the normal background image 50a (i.e., the display surface of the LCD monitor 30). n is added for identifying the drawing positions (X, Y) of the normal focus icons 550 through 572, the addresses of the ROM 16 (Adr) in which each item of image data is stored, and their horizontal length (W) and longitudinal length (H).

FIG. 8 is an illustration of an exemplary drawing table of the normal-focus icons according to an embodiment of the disclosure. A normal-focus icon-drawing table 70 is used for drawing the normal focus icon 550 through 572 corresponding to the selected normal icon 500 through 522 on the normal background image 50a. As shown FIG. 8, in response to the identification information of the currently selected normal focus icon 500 through 522, the drawing positions (Xn, Yn) of the normal focus icons 550 through 572 and the normal focus icon information are described in the normal-focus icon-drawing table 70.

The drawing positions (Xn, Yn) of the focus icons 550 through 572 are the same as described above, therefore common features, functions, and elements may not be redundantly described here. The normal focus icon information describes the address of the ROM 16 (Adrn) in which data (image data) regarding the relative normal focus icon (550 through 572) are stored and the horizontal length (Wn) and longitudinal length (Hn) of the relative normal focus icon (550 through 572).

In the embodiment shown in FIG. 8, because the normal focus icons 550 through 572 have the same size and shape and are attached on the normal background image 50a, the lateral length (Wn) and the longitudinal length (Hn) can be omitted.

For example, when the user issues an instruction for displaying a menu in a state in which the normal size is set, the normal menu screen 50 is displayed on the LCD monitor 30 in a state in which the normal icon 508 with the identification number "4" is focused as shown in FIG. 3A. However, when the normal menu screen 50 is displayed first, the normal icon 508 with the identification number "4" is selected due to the default settings. Therefore, the image data that is described in the address (Adr4) described in the information of the normal focus icon 508 is read out from the ROM 16 and attached on the background image 50a at the drawing position (X4, Y4) described in correspondence to the identification number "4" of the normal icon 508 that is currently selected in the normal-focus icon-drawing table 70. However, the image data of the normal background image 50a is read earlier than the image data of the normal focus icon 508 and is already drawn on a drawing area of a RAM 14 (not shown). In addition, the normal icon (500 through 522), or the identification number "n", to be set as a default may be another identification number.

When the user operates the upward key 20f, the leftward key 20g, the downward key 20h, or the rightward key 20i, the normal icon (500 through 522) to be selected is changed in accordance with the focus management table 60. Then, the normal focus icon 550 through 572 is displayed (changed) in accordance with the normal-focus icon-drawing table 70 as described above. That is, the normal menu screen 50 is updated. Then, for example, the user operates the center key 20e, and although it is not shown in the drawings, a screen for setting or editing the functions corresponding to the currently selected normal icon (500 through 522) is displayed.

In an embodiment, three or more display sizes are selected. In this manner, background images, icons, and focus icons for each display size, and create-focus icon-drawing tables for each display size are created respectively.

In the above embodiments icons are displayed in a grid menu, however, the icons may be displayed, for example but without limitation, in a list, or the like, as long as the content of the icon is expressed, for example but without limitation, by a button image, or the like, with an image and a character string. The character string may be in any language, such as but without limitation, English, Japanese, Spanish, and the like. In an embodiment, each of the languages may be provided as selectable options. In this manner, normal-focus icon-drawing table 70 and enlarged-focus icon-drawing table 90 (FIG. 13) corresponding to each of the languages are stored in a ROM, and a table corresponding to a set (selected) language is used.

Figure 9A:
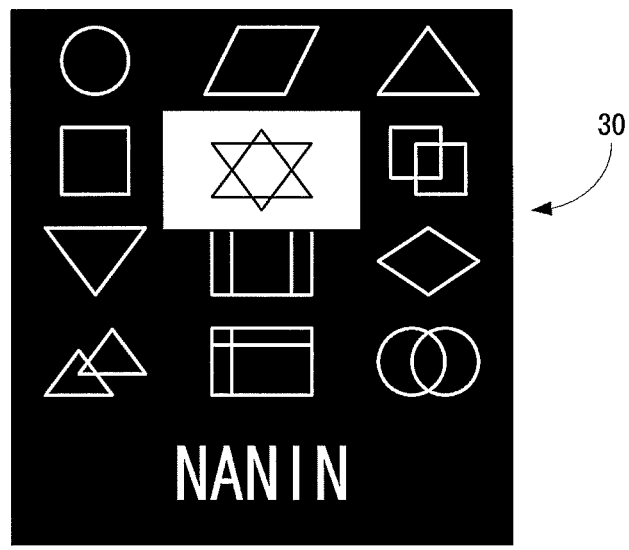
FIGS. 9A and 9B are illustrations of an exemplary enlarged menu screen displayed on the display monitor of the mobile phone shown in FIG. 1 according to an embodiment of the present disclosure.
Figure 9B:
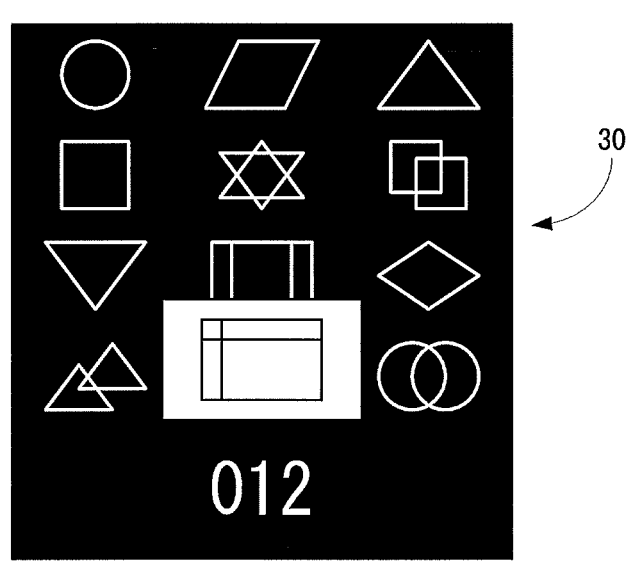

FIGS. 9A and 9B are illustrations of an exemplary enlarged menu screen 80 displaying on the LCD monitor 30 when the enlarged size is set according to an embodiment of the disclosure as described in more detail in conjunction with FIGS. 10A-10B below. Embodiments shown in FIGS. 9A and 9B may have functions, material, and structures that are similar to the embodiments shown in FIGS. 1-8. Therefore common features, functions, and elements may not be redundantly described here.

Figure 10A:
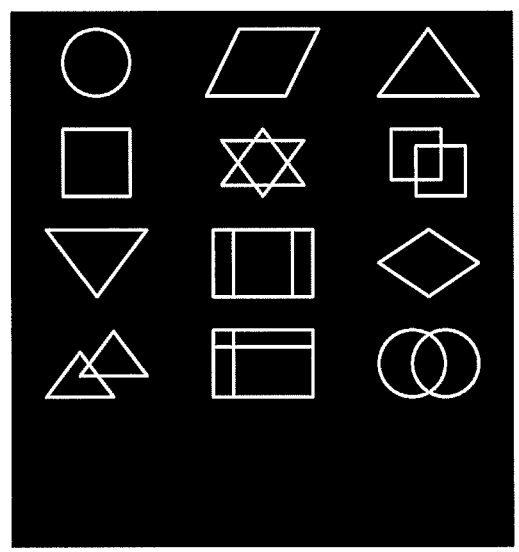
FIGS. 10A and 10B are illustrations of schematic diagrams showing an exemplary enlarged background image comprising the enlarged menu screen shown in FIG. 9 as well as enlarged icons and display areas comprised in the enlarged background image.
Figure 10B:
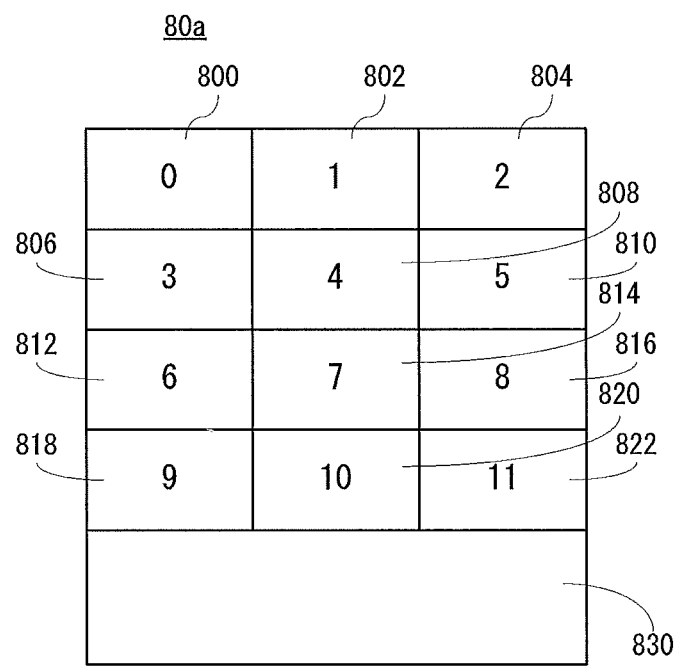

FIGS. 10A and 10B are illustrations of schematic diagrams showing an exemplary enlarged background image composing the enlarged menu screen shown in FIG. 9 as well as enlarged icons and display areas included in the enlarged background image. The enlarged menu screen 80 comprises a background image (enlarged background image) 80a drawn with an enlarged size as shown in FIG. 10A. The enlarged menu screen 80a comprises a plurality of enlarged icons 800, 802, 804, 806, 808, 810, 812, 814, 816, 818, 820 and 822 and a display area 830 as shown in FIG. 10B.

In FIG. 10B, in order to show the enlarged icons 800 through 822 and the display area 830 in a manner easy to understand, patterns (only images in this example) and the background (background color) are not shown.

The enlarged icons 800 through 822 are made identifiable by their identification numbers is the same as in the case of the normal icons 500 through 522, and therefore, the same identification numbers are assigned to icons of the same kind (same functions).

As can be seen by comparing FIG. 4B to FIG. 10B an array (arrangement) of the normal icons 500 through 522 is the same as the array (arrangement) of the enlarged icons 800 through 822. That is, the alignment sequence of the enlarged icons 800 through 822 is set to an alignment sequence corresponding to the alignment sequence of the normal icons 500 through 522.

As shown in FIGS. 9A-9B, and FIG. 10A, the enlarged icons 800 through 822 are icons in which images from the patterns of the normal icons 500 through 522 are enlarged. However, because the normal background image 50a and the enlarged background image 80a are the same size and the enlarged background image 80a is provided with the display area 830, the longitudinal length of the enlarged icons 800 through 822 is set to be shorter than the longitudinal length of the normal icons 500 through 522. In addition, a pattern with an image is displayed on the enlarged icons 800 through 822. This is made for displaying as large an image and a character string as possible on a predetermined display area (display surface of the LCD monitor 30). Furthermore, in the embodiment shown in FIG. 10B, the images drawn on the enlarged icons 800 through 822 are enlarged with the same aspect ratio as the aspect ratio of the images drawn on the normal icons 500 through 522. Longitudinal and/or lateral ratios may be enlarged with a different aspect ratio. In either case, the image can be enlarged by a simple technique.

As shown in FIG. 9A and FIG. 9B, in the enlarged menu screen 80, a selected (instructed) enlarged icon (800 through 822) is focused and displayed in the same manner as in the normal menu screen 50. In an embodiment, as shown in FIG.

11, in response to each of the enlarged icons 800 through 822, the enlarged focus icons 850, 852, 854, 856, 858, 860, 862, 864, 866, 868, 870 and 872 for focusing and display are provided in advance. However, the enlarged focus icons 850 through 872 may be collectively referred to as an "enlarged focus image 80*b*".

The enlarged focus icons 850 through 872 are icons in which the display form of the corresponding enlarged icons 800 through 822 is changed. Specifically, the size of the enlarged focus icons 850 through 872 themselves is enlarged compared to the size of the normal icons 800 through 822 and the size of a pattern (an image in this example) drawn on an icon is also enlarged. In addition, white and black are reversed between the enlarged focus icons 850 through 872 and the enlarged icons 800 through 822.

To simplify the drawing, the enlarged icons 800 through 822 and the enlarged focus icons 850 through 872 are expressed in monochrome, but they may be expressed with colors. In such a case, the color may be reversed between the enlarged focus icons 850 through 872 and the enlarged icons 800 through 822. In addition, brightness of the icons may be changed or the color itself may be changed. That is, because the enlarged focus icons 850 through 872 are only required to be more highlighted than the normal icons 800 through 822, it should not be limited to this example.

As shown in FIG. 9A and FIG. 9B, in the enlarged menu screen 80, a character string is displayed on the display area 830 for describing the function of the selected enlarged icon 800 through 822. In the normal menu screen 50, the character string has the same content as the character string displayed on the normal icons 500 through 522 and the normal focus icons 550 through 572 as their patterns, and the size (font size) is enlarged. That is, in the enlarged menu screen 80, an image displayed on an icon is enlarged and its character string is also enlarged.

Therefore, data regarding character strings corresponding to each of the enlarged icons 800 through 822 (enlarged focus icons 850 through 872) are stored.

FIGS. 12A and 12B are illustrations of exemplary schematic diagrams showing a case in which a certain character string displayed in a display area of the enlarged menu screen shown in FIG. 9 is drawn with text, and a case in which the character string is drawn with an image. Although data of a character string is related to text (text data), the data of the character string may be stored as image data. For example, as shown in FIG. 12A, when a character string (AABBCCIIJJKKMMN) corresponding to the enlarged icon 816 is drawn on the display area 830 as text, some of the characters (i.e., "N") may extend beyond the display area 830. If a character string is longer than the display area 830, the character string is shown in its entirety to the user by scrolling the character string, or the like, but the character string cannot be understood in a single glance. Therefore, in the embodiment shown in FIG. 12B, if the character string is longer, a character string created by an image (image of the character string) will be drawn on the display area 830. In such a case, as shown in FIG. 12B, any characters with a shorter width (i.e., "I") can be drawn tightly, and therefore, all characters can be placed within the display area 830. Therefore, the character string can be understood in a single glance without scrolling. The characters may be, for example but without limitation, hiragana, katakana, numbers, alphabet and the like.

FIG. 13 is an illustration of an exemplary drawing table of the enlarged focus icons according to an embodiment of the disclosure. In the enlarged-focus icon-drawing table 90, the drawing position (Xm, Ym) (m=20, 21, . . . , 31), enlarged focus icon information, and character string information are described in correspondence to the identification number of the currently selected enlarged icon 800 through 822. The drawing position (Xm, Ym) and the enlarged focus icon information are the same as the abovementioned drawing position (Xn, Yn) and the normal focus icon information described in the normal-focus icon-drawing table 70. Therefore common features, functions, and elements may not be redundantly described here.

The character string information is data regarding addresses of the ROM 16 (Adrp) (p=50, 51, . . . , 61) in which character string data (text data or image data) displayed (drawn) on the display area 830 are stored in correspondence to the selected enlarged icon (800 through 822).

Similar to the normal-focus icon-drawing table 70, n shows the identification information of the enlarged icons 800 through 822. As described above, because the array of the normal icons 500 through 522 is the same as the array of the enlarged icons 800 through 822, the focus management table 60 is used for both. In addition, in the enlarged-focus icon-drawing table 90, similar to the identification number "n" of the enlarged icons 800 through 822, m (m=20 through 31) is added for identifying the drawing positions (X, Y) of the enlarged focus icons 850 through 872, the addresses of the ROM 16 (Adr) in which each item of image data is stored, and their horizontal length (W) and longitudinal length (H). Similarly, p (p=50 through 61) is added to identify the addresses of the ROM 16 (Adr) in which character string data corresponding to each of the enlarged icons 800 (enlarged focus icons 850 through 872) is stored.

For example, when the user issues an instruction for displaying a menu in a state in which the enlarged size is set, the enlarged menu screen 80 is displayed on the LCD monitor 30 in a state in which the enlarged icon 808 with the identification number "4" is focused as shown in FIG. 9A. However, when the enlarged menu screen 80 is displayed first, the normal icon 808 with the identification number "4" is selected due to the default settings. Therefore, the image data that is described in the address (Adr24) described in the information of the enlarged focus icon is read out from the ROM 16 and attached on the background image 80*a* at the drawing position (X24, Y24) described in correspondence to the identification number "4" for the enlarged icon 808 that is currently selected in the enlarged-focus icon-drawing table 90. However, the image data of the enlarged background image 80*a* is read earlier than the image data of the enlarged focus icon 808 and is already drawn on a drawing area of the RAM 14 (not shown). In addition, the character string data that is described in the address of character string information (Adr54) described in response to the identification number "4" of the enlarged focus icon 808 that is currently selected in the enlarged-focus icon-drawing table 90 is read out and attached on the display area 830 of the background image 80*a*.

When the user operates the upward key 20*f*, the leftward key 20*g*, the downward key 20*h*, or the rightward key 20*i*, the enlarged icon (800 through 822) to be selected is changed in accordance with the focus management table 60. As described above, the focus management table 60 is commonly used. Then, the enlarged focus icon (850 through 872) is displayed (changed) in accordance with the enlarged-focus icon-drawing table 90. That is, the enlarged menu screen 80 is updated. Then, for example, the user operates the center key 20*e*, a screen (not shown) for setting or editing the functions corresponding to the currently selected enlarged icon (800 through 822) is displayed.

As shown in FIG. 9B, the enlarged focus icons 868, 870, 870 in the bottom are displayed on the display area 830 so that they are not overlapped.

Figure 14:
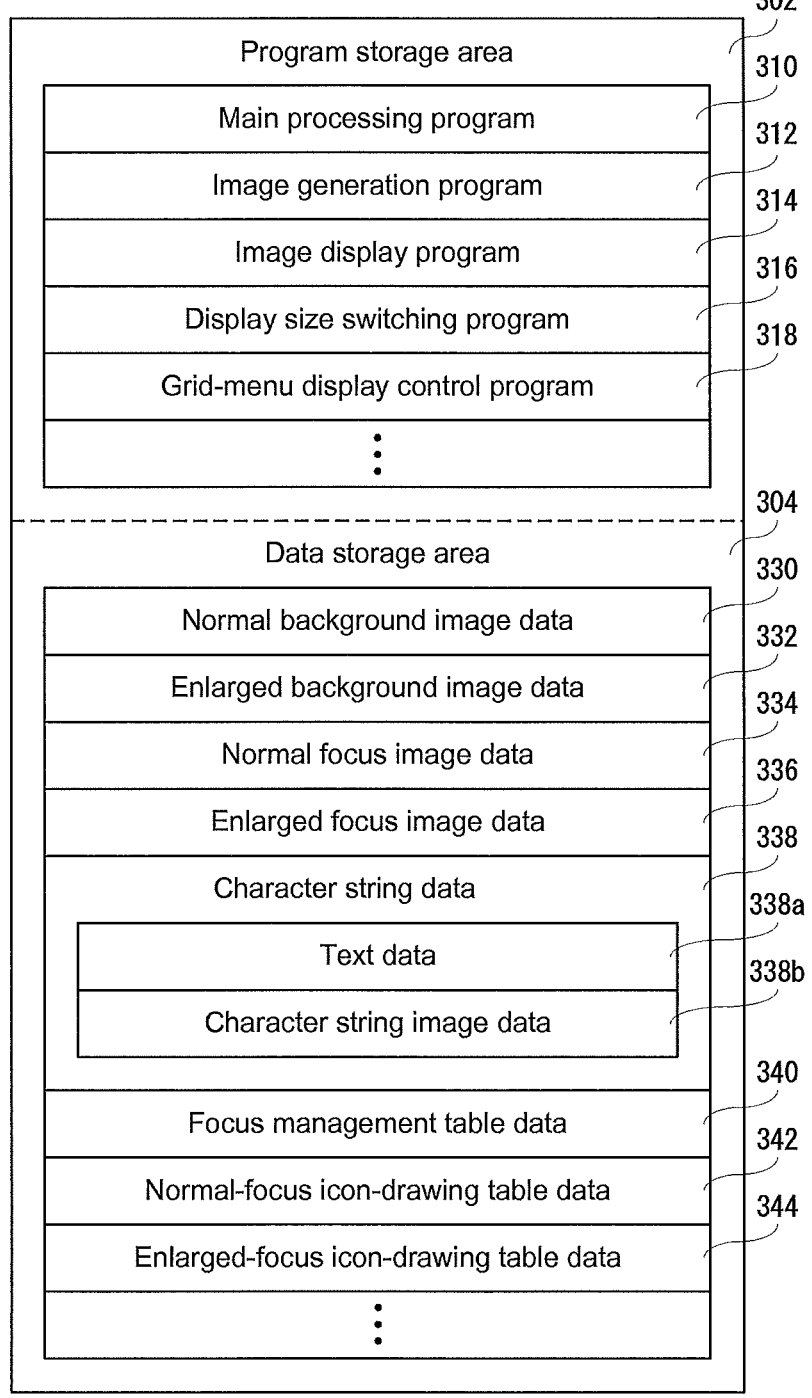
FIG. 14 is an illustration of an exemplary memory map of a ROM shown in FIG. 1.

FIG. 14 is an illustration of an exemplary memory map 300 of a ROM 16 shown in FIG. 1. The ROM 16 comprises a program storage area 302 and a data storage area 302. An information-processing program for the mobile phone 10 is stored in the program storage area 302, and comprises a main processing program 310, an image generation program 312, an image display program 314, a display size-switching program 316, and a grid-menu display control program 318.

The main processing program 310 processes program code for operating the mobile phone 10. The image generation program 312 generates various images displayed (output) on the LCD monitor 30 using polygon data or texture data (not shown), normal background image data 330, enlarged background image data 332, normal focus image data 334, enlarged focus image data 336, character string image data 338b, and the like, as described below. The image display program 314 displays an image generated in accordance with the image generation program 312 on the LCD monitor 30 via the LCD driver 22.

The display size-switching program 316 switches (selecting) between normal size and enlarged size in accordance with the operations of the user. The grid-menu display control controls the normal menu screen 50 and enlarged menu screen 80.

The information-processing program may also comprise other programs. For example, programs for carrying out various functions such as a dictionary function, a clock/calendar function, an electronic calculator function, a program for outputting sounds (music) such as an incoming call tone required for the mobile phone 10, or the like.

The normal background image data 330, the enlarged background image data 332, the normal focus image data 334, the enlarged focus image data 336, character string data 338, focus management table data 340, normal-focus icon-drawing table data 342, and enlarged-focus icon-drawing table data 344 are stored in the data storage area 304.

Figure 11:
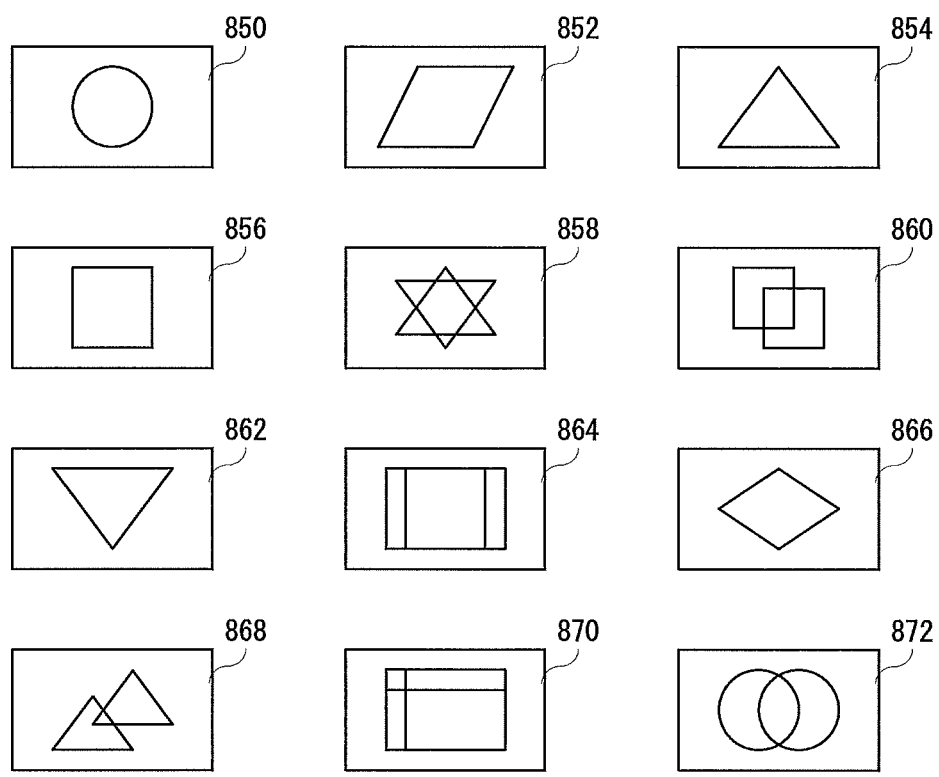
FIG. 11 is an illustration of an exemplary enlarged focus images (enlarged focus icons) composing the enlarged menu screen shown in FIG. 9.

The normal background image data 330 is image data for the normal background image 50a as shown in FIG. 4A. The enlarged background image data 332 is image data for the enlarged background image 80a as shown in FIG. 10A. The focus image data 334 is image data of the normal focus image 50b shown in FIG. 5, or in other words, image data regarding each of the normal focus icons 550 through 572. The enlarged focus image data 336 is image data of the enlarged focus image 80b shown in FIG. 11, or in other words, image data regarding each of the enlarged focus icons 850 through 872.

The character string data 338 comprises character strings corresponding to each of the enlarged icons 800 through 822 and comprises text data 338a and the character string image data 338b. The focus-management table data 340 comprises data for focus management table 60 shown in FIG. 6. The normal-focus icon-drawing table data 342 comprises data for the normal-focus icon-drawing table 70 shown in FIG. 8. In addition, the enlarged-focus icon-drawing table data 344 comprises data for enlarged-focus icon-drawing table 90 shown in FIG. 13. The data may further comprise, for example but without limitation, polygon data, texture data, sound data, or the like, stored in the data storage area 304.

Figure 15:
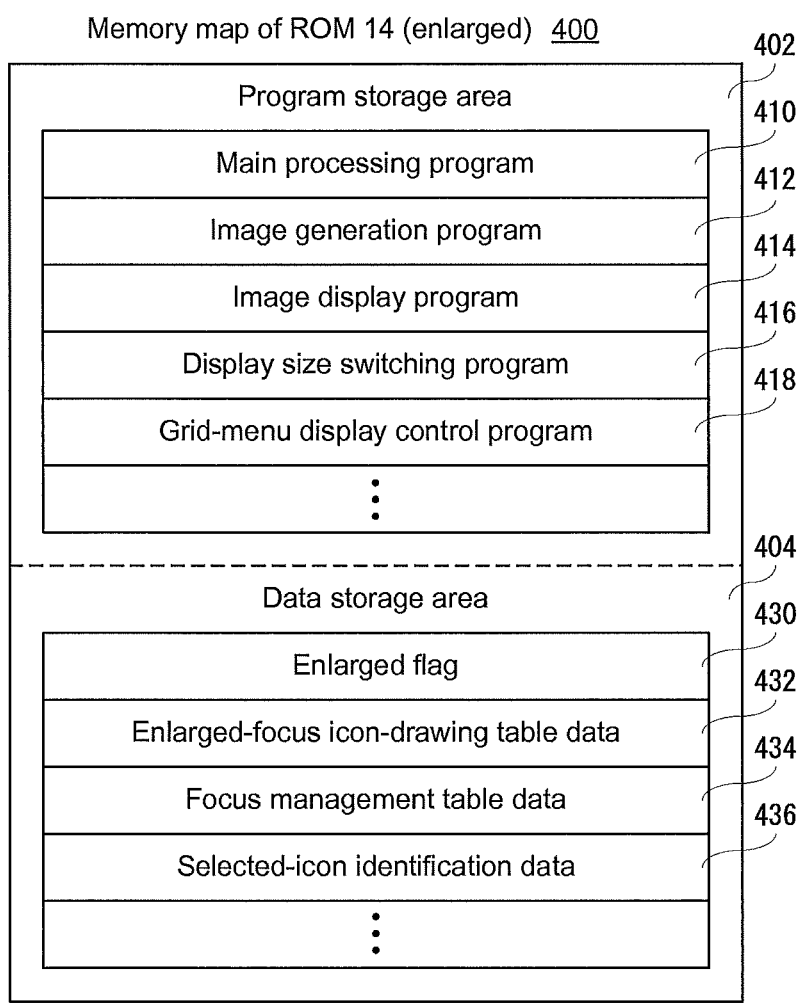
FIG. 15 is an illustration of an exemplary memory map of a RAM shown in FIG. 1 when an enlarged size is selected.
Figure 16:
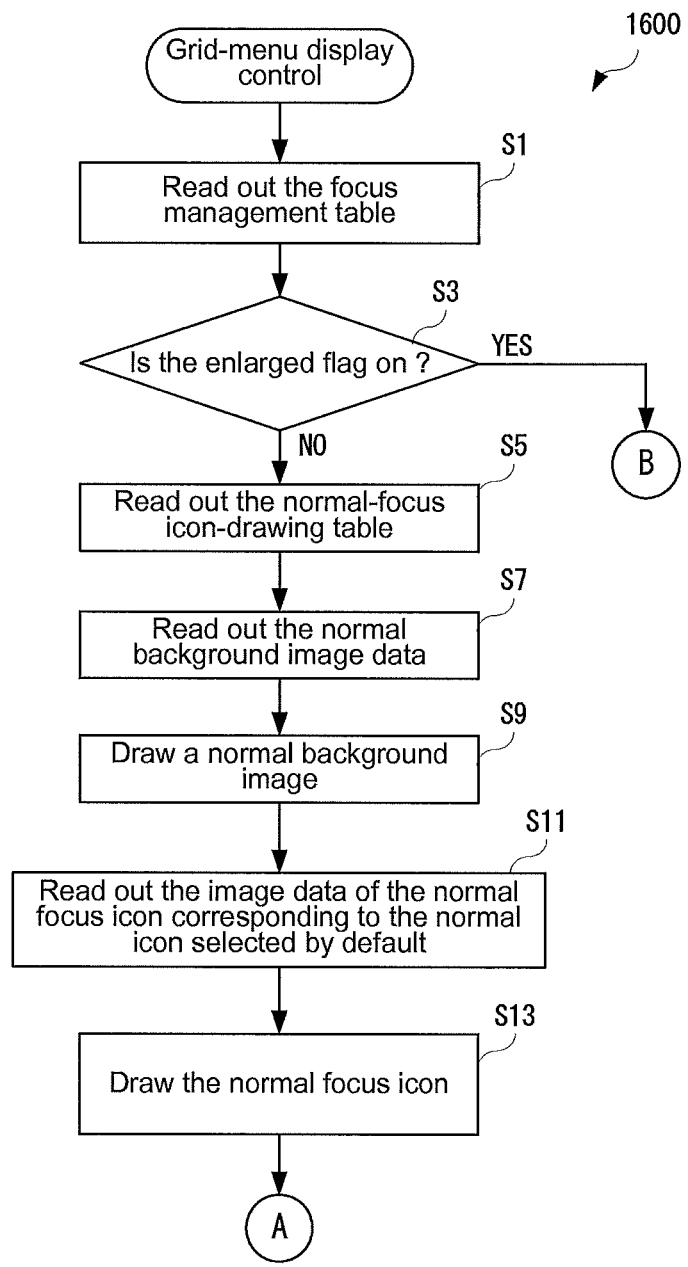
FIGS. 16-19 are illustrations of various parts of an exemplary flow diagram showing a grid-menu display-control process of a CPU shown in FIG. 1.
Figure 17:
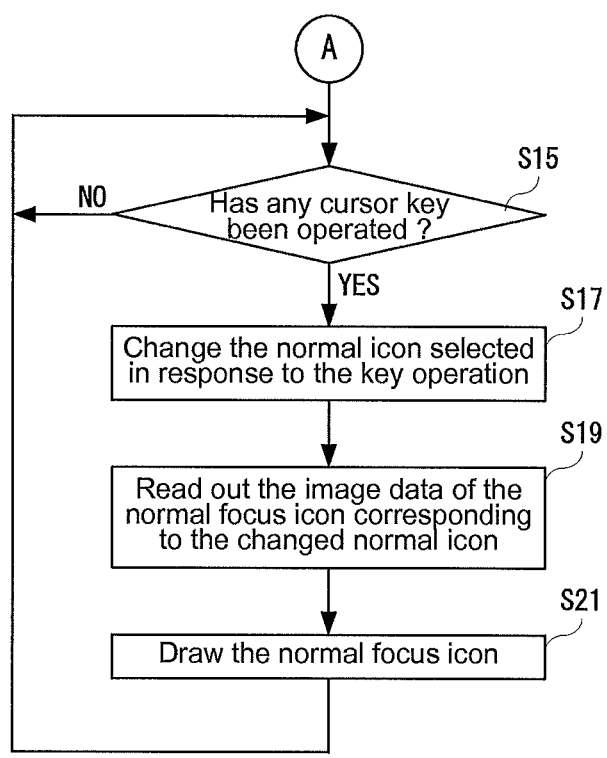
Figure 18:
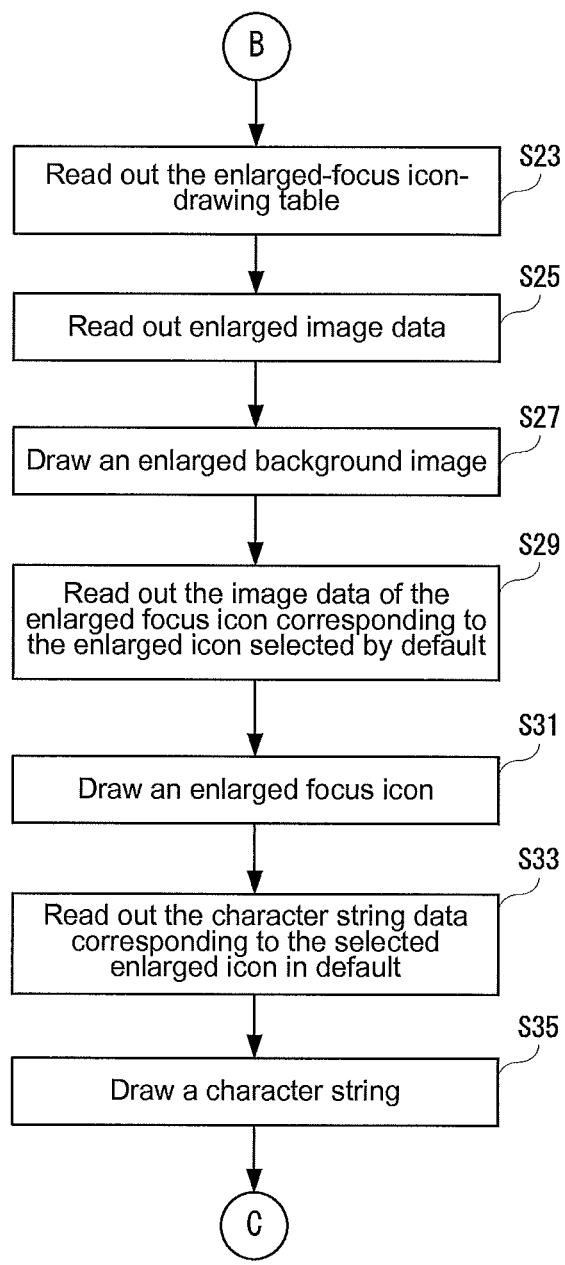
Figure 19:
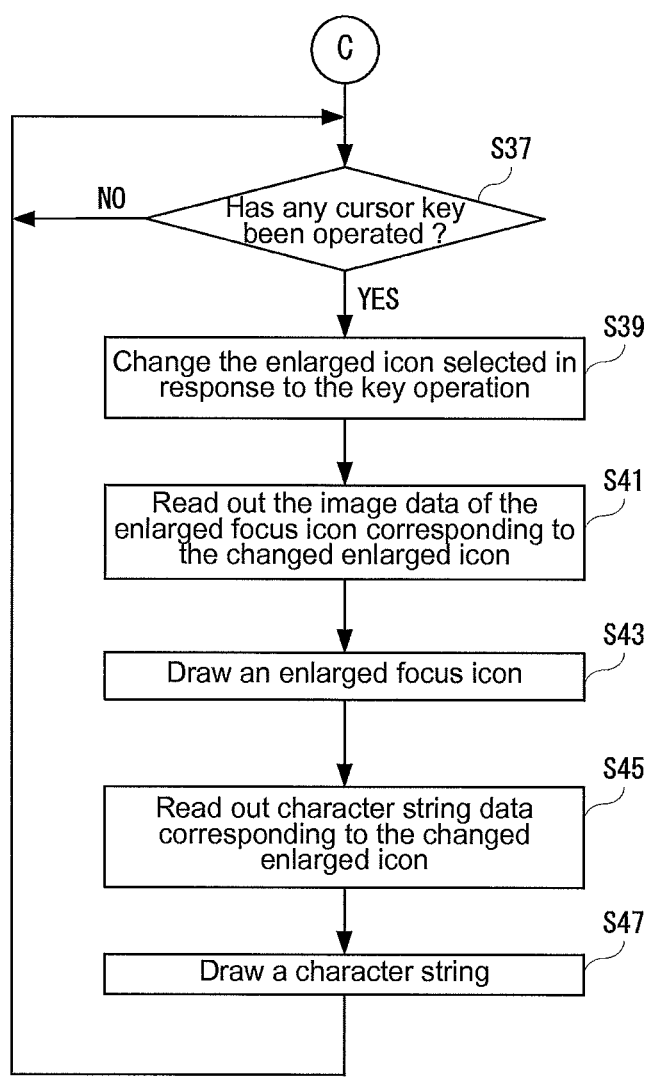

FIG. 15 is an illustration of an exemplary memory map 400 of a RAM 14 shown in FIG. 1 when an enlarged size is selected. Memory map 400 comprises a program storage area 402 and a data storage area 404. The program storage area 402 is the same as the program storage area 400 of the ROM 16, therefore common features, functions, and elements may not be redundantly described here.

For example, an information-processing program stored in the ROM 16 is loaded into the RAM 14 in its entirety at one time or partially and sequentially if necessary.

The data storage area 404 is provided with an enlarged flag 430. In addition, enlarged-focus icon-drawing table data 432, focus management table data 434, and selected-icon identification data 436 are stored in the data storage area 404.

The enlarged flag 430 determines whether the enlarged size is selected (set) and comprises a one-bit register. When the enlarged flag 430 is turned on (established), a data value "1" is set to the register, while when the enlarged register 430 is turned off (not established), a data value "0" is set to the register. However, when the enlarged size is set by the user, the enlarged 430 is turned on, while when the normal size is set, the enlarged flag 430 is turned off. FIG. 15 shows a case in which the enlarged flag 430 is on. If the normal size is set as the default, the enlarged flag 430 is off.

The enlarged-focus icon-drawing table data 432 and the focus-management table data 434 are the same as the data stored in the memory map 300 of the ROM 16, therefore common features, functions, and elements may not be redundantly described here.

In FIG. 15, because the enlarged flag 430 is on, the enlarged-focus icon-drawing table data 344 is loaded from the ROM 16. Therefore, when the enlarged flag 430 is off and the normal size is selected, the normal-focus icon-drawing table data 342 will be loaded. However, because the focus management table 60 is used for both the normal size and the enlarged size, the focus management table data 340 is loaded from the ROM 16 regardless of whether the enlarged flag 430 is on or off.

The selected-icon identification data 436 is data (numeric data) that expresses the identification number of the currently selected icon (here, the enlarged icon (800 through 822)). Therefore, when the selected icon is changed, the selected-icon identification data 436 is updated as well. Other data for executing the information processing program, such as for example but without limitation, counter (timer), other flags and the like, may be stored in the data storage area 404.

FIGS. 16 to 19 are illustrations of various parts of an exemplary flow diagram showing a grid-menu display-control process 1600 that can be performed by the CPU 12 according to an embodiment of the disclosure. The various tasks performed in connection with the process 1600 may be performed by software, hardware, firmware, a computer-readable medium having computer executable instructions for performing the process method, or any combination thereof. The process 1600 may be recorded in a computer-readable medium such as a semiconductor memory, a magnetic disk, an optical disk, and the like, and can be accessed and executed, for example, by a computer CPU such as the CPU 12 in which the computer-readable medium is stored. It should be appreciated that process 1600 may include any number of additional or alternative tasks, the tasks shown in FIGS. 16 to 18 need not be performed in the illustrated order, and process 1600 may be incorporated into a more comprehensive procedure or process having additional functionality not described in detail herein. For illustrative purposes, the following description of process 1600 may refer to elements mentioned above in connection with FIGS. 1-15. In practical embodiments, portions of process 1600 may be performed by different elements of the mobile phone 10 for example the CPU 12, the RAM 14, the ROM 16, the flash memory 18, the key input device 20, the LCD driver 22, the A/D converter 24, the D/A converter 26, the wireless communication module 28, the clock circuit 38 of the mobile phone 10, etc. The process 1600 may have functions, material, and structures that are similar to the embodiments shown in FIGS. 1-15. Therefore common features, functions, and elements may not be redundantly described here.

The CPU 12 initiates the process 1600 in response to an instruction form a user for displaying a menu. The process 1600 may then proceed by the CPU 12 reading the focus management table 60 (task S1). In this manner, the CPU 12 reads the focus-management table data 340 from the ROM 16 and writes the focus management table data 340 into the data storage area 404 of the RAM 14. In the embodiment shown in FIG. 16, default data of the identification number "4" is set to the selected-icon identification data 436, before or after the task S1 is executed.

The process 1600 may then continue by the determining whether the enlarged flag 430 is turned on (inquiry task S3).

The enlarged flag 430 is either turned on or off in accordance with the user input. If it is determined that the enlarged flag 430 is on ("YES" branch of inquiry task S3), then it is determined that the enlarged size is selected and the process 1600 proceeds to task S23 in FIG. 18. Otherwise, if it is determined that the enlarged flag 430 is off ("NO" branch of inquiry task S3) it is determined that the normal size is selected.

Process 1600 may then read the normal-focus icon-drawing table 70 (task S5). In this manner, the CPU 12 reads the normal-focus icon-drawing table data 334 from the ROM 16 and writes it into the data storage area 404 of the RAM 14.

Process 1600 may then read the normal background image data 330 from the ROM 16 (task S7).

Process 1600 may then draw the normal background image 50*a* in a drawing area (not shown) of the RAM 14 (task S9).

Process 1600 may then read the image data of the normal focus icon (the normal focus icon 558) corresponding to the normal icon (the normal icon 508) that is selected as a default (task S11). For example, the CPU 12 refers to the normal-focus icon-drawing table 70 and reads the image data of the normal focus icon 558 from the ROM 16 in accordance with an address (i.e., Adr4) acquired by reference.

Process 1600 may then continue by drawing a normal focus icon (task S13). In this manner, the CPU 12 draws (attaches) the read image data of the normal focus icon 558 on the normal background image 50*a* so that the upper left corner of the normal focus icon 558 is positioned at the coordinate position (X4, Y4) indicated by the normal-focus icon-drawing table 70 by using the origin O of the normal background image 50*a* previously drawn in the drawing area of the RAM 14.

Process 1600 may then continue by determining whether a cursor key is activated (inquiry task S15). In this manner, the CPU 12 determines whether the upward key 20*f*, the leftward key 20*g*, the downward key 20*h*, or the rightward key 20*i* is activated. If it is determined that no cursor key was activated ("NO" branch of inquiry task S15), the process 1600 returns to the inquiry task S15. Otherwise, if it is determined that a cursor key was activated ("YES" branch of inquiry task S15), the process 1600 changes the normal icon (500 through 522) that is selected in response to the key activation (task S17). In this manner, the normal icon (500 through 522) that is focused and displayed is changed. Specifically, the CPU 12 acquires the identification number "n" of the changed icon (500 through 522) in accordance with the focus management table 60. The selected-icon identification data 436 is then updated with the acquired data of the identification number "n".

Process 1600 may then continue by reading, the image data of the normal focus icon (500 through 522) corresponding to the changed normal icon (500 through 522) (task S19). In this manner, the CPU 12 accesses the normal-focus icon-drawing table 70 and reads the image data from the ROM 16 in accordance with the address (Adrn) described in response to the identification number "n" acquired in task S17.

Process 1600 may then continue by drawing, the normal focus icon (550 through 572) (task S21). In this manner, the CPU 12 draws the data read out in the task S19 on the normal background image 50*a* in accordance with a coordinate position (Xn, Yn) acquired from the normal-focus icon-drawing table 70. However, although it is not shown in the drawings, before the process of step S21 is executed, the image data of the previously drawn normal focus icon (550 through 572) is deleted. The process 1600 then returns to the task S15.

As described above, if the enlarged flag 430 is on and the determination is "YES" in step S3, the enlarged-focus icon-drawing table 90 is read out in the inquiry step S23. In this manner, the CPU 12 reads the enlarged-focus icon-drawing table data 344 from the ROM 16 and writes the enlarged-focus icon-drawing table data 344 into the data storage area 404 of the RAM 14.

Process 1600 may then continue, by reading the enlarged background image data 332 from the ROM 16 (task S25).

Process 1600 may then continue by drawing the enlarged background image 80*a* (task S27). In this manner, the enlarged background image data 332 is drawn in the drawing area of the RAM 14.

Process 1600 may then continue by reading the image data of the enlarged focus icon (i.e., enlarged focus icon 858) corresponding to the enlarged icon (here, the enlarged icon 808) that is selected as a default is read out (task S29).

Process 1600 may then continue by drawing an enlarged focus icon. In this manner, the CPU 12 accesses the enlarged-focus icon-drawing table 90, reads the image data from the ROM 16 in accordance with the address (Adr24) of the enlarged focus icon (858) described in response to the identification number "4" set as a default, and the image data is drawn on the background image 80*a* that is already drawn in accordance with the drawing position (X24, Y24) described in response to the identification number "4" also set as a default.

Process 1600 may then continue by reading character string data corresponding to the enlarged icon that is selected as a default (task S33).

Process 1600 may then continue by drawing a character string (task S35). In this manner, the CPU 12 accesses the enlarged-focus icon-drawing table 90, reads out the character string data 338 (text data 338*a* or character string image data 338*b*) from the ROM 16 in accordance with the address (Adr54) of the character information described in response to the identification number "4" set as a default, and the character string data is drawn in the display area 830 of the enlarged background image 80*a* that has already been drawn.

Process 1600 may then continue by determining whether a cursor key is activated (inquiry task S37). If it is determined that no cursor key is activated ("NO" branch of the inquiry task 37), the process 1600 returns to the task S37. However, if it is determined that a cursor key is activated ("YES" branch of the inquiry task 37), the enlarged icon (800 through 822) selected in accordance with the key operations is changed (task S39).

Process 1600 may then continue by reading the image data of the enlarged focus icon (850 through 872) corresponding to the changed enlarged icon (800 through 822).

Process 1600 may then continue by drawing the enlarged focus icon (850 through 872) (task S43). In this manner, the CPU 12 accesses the enlarged-focus icon-drawing table 90, reads the image data from the ROM 16 in accordance with the address (Adrm) of the enlarged focus icon 858 described in response to the changed identification number "n", and the image data is drawn on the enlarged background image 80a that is already drawn in accordance with the drawing positions (Xm, Ym) described in response to the identification number "n" also set as a default. However, before the changed enlarged focus icon (850 through 872) is drawn in step S43, the already drawn enlarged focus icon (850 through 872) is deleted.

Process 1600 may then continue by reading the character string data corresponding to the changed enlarged icon (task S45).

Process 1600 may then continue by drawing the character string. In this manner, the CPU 12 accesses the enlarged-focus icon-drawing table 90, reads the character string data 338 (text data 338a or character string image data 338b) from the ROM 16 in accordance with the address (Adrp) of the character information described in response to the changed identification number "n", and the character string data is drawn in the display area 830 of the enlarged background image 80a that has already been drawn. However, before the character string corresponding to the changed enlarged focus icon (850 through 872) is drawn in task S47, the previously drawn character string is deleted. Process 1600 may then return to task S37.

The display process of the normal menu screen 50 and the enlarged menu screen 80 is executed in the CPU 12, and when there is an instruction for executing a menu (e.g., the center key 20e is activated) in the CPU 12, the function that is set to the item (normal icon (500 through 522) or enlarged icon (800 through 822)) selected at that time is executed.

According an embodiment, because an image and a character sting representing the content of each function are displayed by changing their size in response to a selection by the user, the content can be understood in a single glance based on the image and the character string even if the size is changed.

In an embodiment, an image is described as the pattern of a normal focus icon and a character string is drawn on the normal focus icon.

Specifically, in the normal focus image 50b shown in FIG. 5, the character string is deleted from each of normal focus icons 550 through 572. In addition, character string data (text data or character string image data) is stored in the ROM 16 in correspondence to the normal focus icon. Furthermore, in the normal-focus icon-drawing table 70, character string information is added in a manner similar to the enlarged-focus icon-drawing table 90 shown in FIG. 13. The storage location (address) of the character string data corresponding to the normal focus icons 550 through 572 is described.

This embodiment enables the drawing of a character string on a normal focus icon. Information regarding positions (character-string drawing positions) for drawing the character string (character string data) is further described. For the character-string drawing position, a leftward (X) and a downward (Y) distance based on the origin O of the normal background image 50a may be set, or a lateral (X) and downward (Y) distance relative to a reference point (for example, the upper top left) of the corresponding normal icon (550 through 572) may be set.

If the size of a character string drawn with character string data can be changed (enlarged or reduced), the character string data may be used for both the normal size and the enlarged size.

Figure 20:
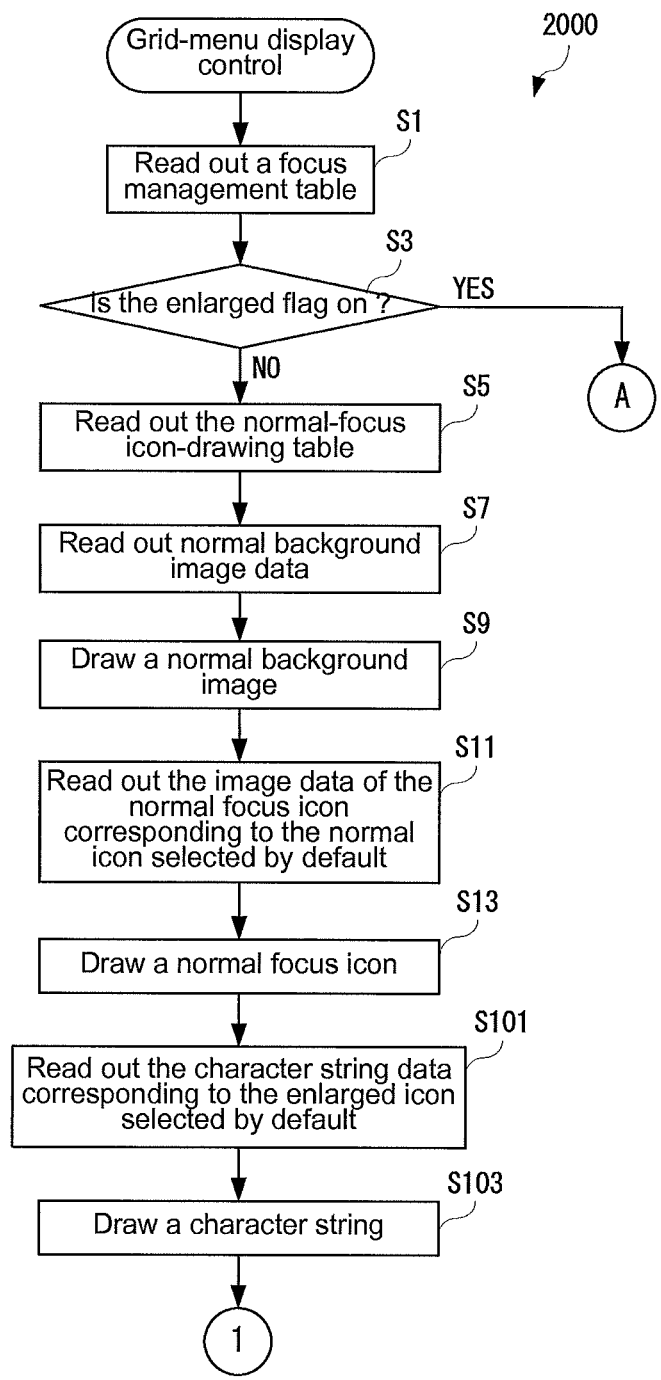
FIGS. 20-21 are illustrations of an exemplary flow diagram showing various parts of the grid-menu display-control process of the CPU according to an embodiment of the disclosure.
Figure 21:
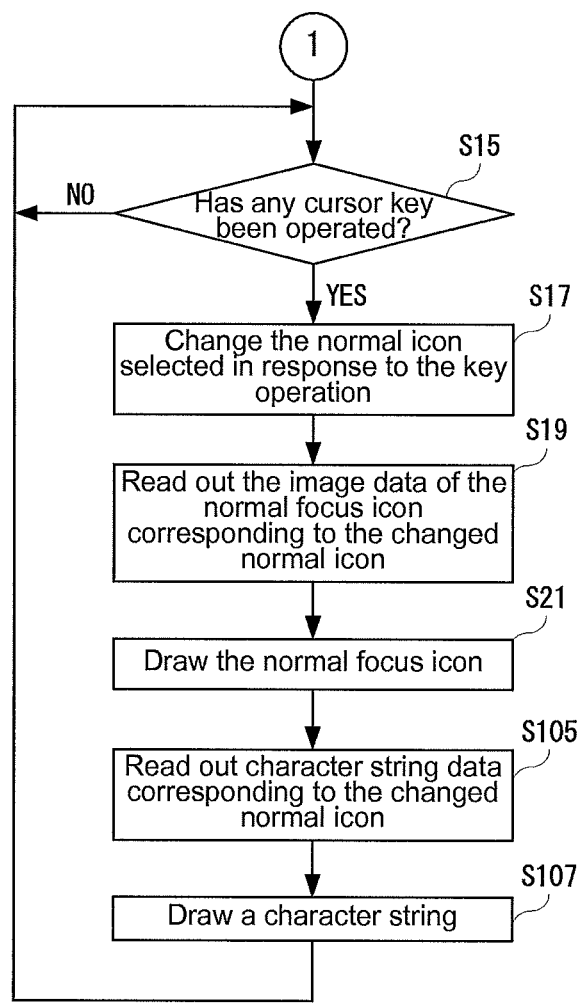

FIGS. 20-21 are illustration of an exemplary flow diagram showing various parts of a grid-menu display-control process 2000 that can be performed by the CPU 12 according to an embodiment of the disclosure. The various tasks performed in connection with the process 2000 may be performed by software, hardware, firmware, a computer-readable medium having computer executable instructions for performing the process method, or any combination thereof. The process 2000 may be recorded in a computer-readable medium such as a semiconductor memory, a magnetic disk, an optical disk, and the like, and can be accessed and executed, for example, by a computer CPU such as the CPU 12 in which the computer-readable medium is stored. It should be appreciated that process 2000 may include any number of additional or alternative tasks, the tasks shown in FIGS. 20 to 21 need not be performed in the illustrated order, and process 2000 may be incorporated into a more comprehensive procedure or process having additional functionality not described in detail herein. For illustrative purposes, the following description of process 2000 may refer to elements mentioned above in connection with FIGS. 1-19. In practical embodiments, portions of process 2000 may be performed by different elements of the mobile phone 10 for example the CPU 12, the RAM 14, the ROM 16, the flash memory 18, the key input device 20, the LCD driver 22, the A/D converter 24, the D/A converter 26, the wireless communication circuit 28, the clock module 38 of the mobile phone 10, etc. The process 2000 may have functions, material, and structures that are similar to the embodiments shown in FIGS. 1-19. Therefore common features, functions, and elements may not be redundantly described here.

In the embodiment shown in FIGS. 20-21 process 2000 performs tasks S101, S103, S105, and S107 in addition to tasks S1 through S21 performed in the process 1600. Therefore, common features, functions, and elements of process 1600 may not be redundantly described herein. As described above in the context of discussion of process 1600, the normal background image 50a and the normal focus icon corresponding to the normal icon (500 through 522) that is selected as a default are drawn by the processes of tasks S1 through S13. However, a pattern comprising an image is described in the normal focus icon that is drawn by tasks S1-S13.

Process 2000 may continue by reading character string data corresponding to the normal icon (500 through 522) that is selected as a default (task S101), and then drawn the character string is (task S103). In this manner, the CPU 12 accesses the normal-focus icon-drawing table of the other embodiment, acquires an address from the character information described corresponding to the identification number ("4") that is selected as a default, and reads character string data from the ROM 16 in accordance with the address. In addition, the CPU 12 draws the read-out character string data on the normal focus icon in accordance with the character-string drawing position described in correspondence to the identification number "4" of the normal-focus icon-drawing table of the other embodiments.

Process 2000 may continue by reading a key operation ("YES" branch of the task S15) and the normal icon (500 through 522) to be selected is changed. The normal focus icon corresponding to the changed normal icon (500 through 522) is drawn on the normal background image 50a through the processes of the tasks S17 through S21 as mentioned above.

Process 2000 may then continue by reading character string data corresponding to the changed normal icon (500 through 522) (task S105).

Process 2000 may then continue by drawing the character string (task S107). In this manner, the CPU 12 accesses to the normal-focus icon-drawing table 70, acquires the address from character information described is correspondence to the changed identification number "n", and reads out character string data from the ROM 16 in accordance with the address. In addition, the CPU 12 draws the read-out character string data on the normal focus icon in accordance with the character-string drawing position described corresponding to the identification number "n" of the normal-focus icon-drawing table 70. Process 2000 may then leads back to task S15.

In an embodiment, because an image and a character are displayed by changing their size, the content can also be understood in a single glance (i.e., if the display size of an image and a character string is changed, it is only necessary to be able to understand the content in a single glance in a limited display area).

As described above, because both the size of a character string and the size of a corresponding image are changed when the display size is changed, content can be understood in a single glance.

In this document, the terms "computer program product", "computer-readable medium", and the like may be used generally to refer to media such as, for example, memory, storage devices, or storage unit. These and other forms of computer-readable media may be involved in storing one or more instructions for use by the CPU 12 to cause the CPU 12 to perform specified operations. Such instructions, generally referred to as "computer program code" or "program code" (which may be grouped in the form of computer programs or other groupings), when executed, enable a grid-menu display-control method of the mobile phone 10.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

What is claimed is:

1. An electronic device comprising:
   a memory operable to store a plurality of predetermined items, a plurality of images and a plurality of character strings, each image and character string corresponding to a respective one of the plurality of predetermined items, each character string stored separately as both text data and image data;
   at least one processor coupled to the memory and configured to:
   receive a user selection of a first size or second size; and set a display pattern displayed on a display to a first pattern if the first size is selected or set the display pattern to a second pattern if the second size is selected, the first pattern comprising the plurality of predetermined items displayed in a first predetermined display area, each predetermined item comprising an image together with a character string, the second pattern comprising the plurality of images displayed in a second predetermined display area wherein none of the plurality of character strings are displayed, and a character string, corresponding to a selected image, displayed in a third predetermined display area where none of the plurality of images are displayed, wherein the second predetermined display area is smaller than the first predetermined display area but each of the plurality of images displayed in the second predetermined display area is larger than a corresponding one of the plurality of images when displayed in the first predetermined display area, wherein the character string displayed in the third predetermined display area is drawn on the display using either the stored text data or the stored image data depending on whether the character string is longer than the third predetermined display area.

2. A method for operating an electronic device, the method comprising:
   storing in a memory of the electronic device a plurality of predetermined items, a plurality of images and a plurality of character strings, each image and character string corresponding to a respective one of the plurality of predetermined items, each character string stored separately as both text data and image data;
   receiving a user selection of a first size or a second size; and
   displaying a first pattern, if the first size is selected; and displaying a second pattern, if the second size is selected;
   the first pattern comprising the plurality of items displayed in a first predetermined display area, each of the plurality of items comprising an image together with a character string;
   the second pattern comprising the plurality of images displayed in a second predetermined display area where none of the plurality of character strings are displayed, and a character string, corresponding to a selected image, displayed in a third predetermined display area where none of the plurality of images are displayed, wherein the second predetermined display area is smaller than the first predetermined display area but each of the plurality of images displayed in the second predetermined display area is larger than a corresponding one of the plurality of images when displayed in the first predetermined display area, wherein the character string displayed in the third predetermined display area is drawn on the display using either the stored text data or the stored image data depending on whether the character string is longer than the third predetermined display area.

3. A non-transitory computer readable medium comprising computer-executable program code, the program code when executed performing a method for operating a display of an electronic device, the method comprising:

storing in a memory of the electronic device a plurality of predetermined items, a plurality of images and a plurality of character strings, each image and character string corresponding to a respective one of the plurality of predetermined items, each character string stored separately as both text data and image data;

receiving a user selection of a first size or a second size; and displaying a first pattern, if the first size is selected; and displaying a second pattern, if the second size is selected;

the first pattern comprising the plurality of items displayed in a first predetermined display area, each of the plurality of items comprising an image together with a character string;

the second pattern comprising the plurality of images displayed in a second predetermined display area where none of the plurality of character strings are displayed, and a character string, corresponding to a selected image, displayed in a third predetermined display area where none of the plurality of images are displayed, wherein the second predetermined display area is smaller than the first predetermined display area but each of the plurality of images displayed in the second predetermined display area is larger than a corresponding one of the plurality of images when displayed in the first predetermined display area, wherein the character string displayed in the third predetermined display area is drawn on the display using either the stored text data or the stored image data depending on whether the character string is longer than the third predetermined display area.

\* \* \* \* \*